June 6, 1972   N. MARTELLI   3,667,889
VACUUM MOULDING MACHINE
Filed Aug. 14, 1970   6 Sheets-Sheet 1

Inventor
Nerio Martelli
by:
Edwin E. Greigg

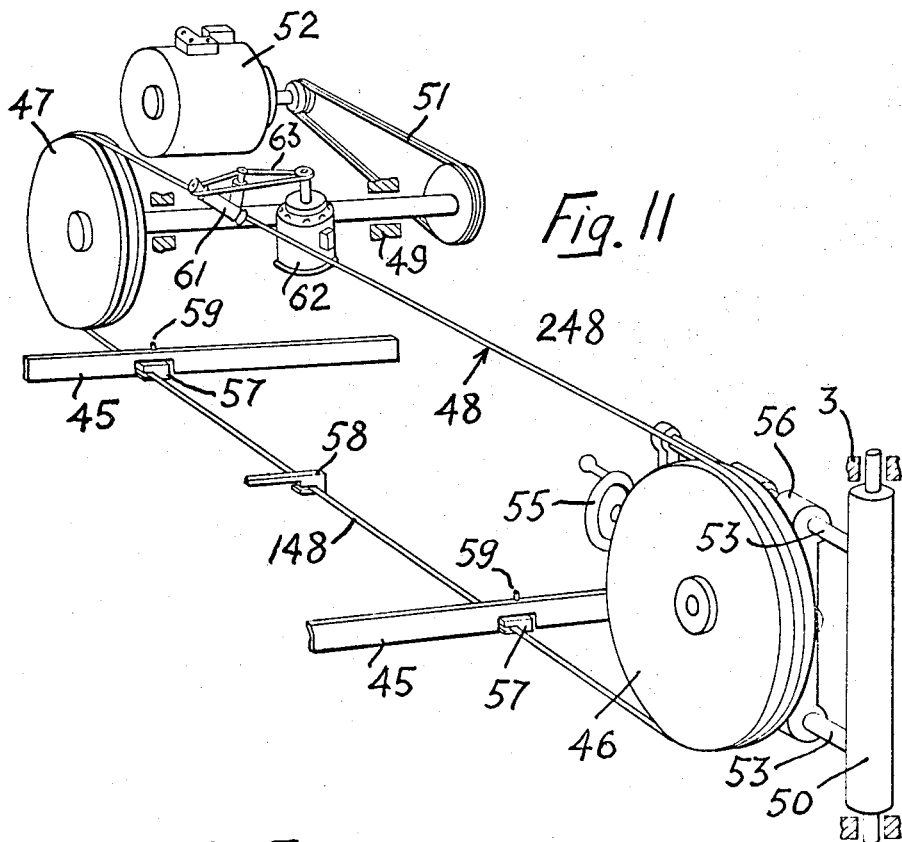
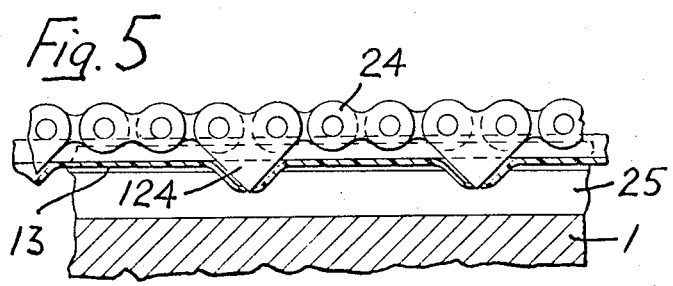
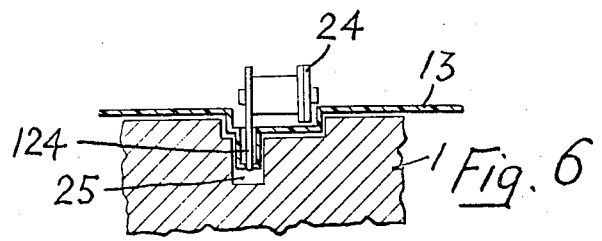

3,667,889
VACUUM MOULDING MACHINE
Nerio Martelli, 6 Via Cavaioni, Bologna, Italy
Filed Aug. 14, 1970, Ser. No. 63,857
Claims priority, application Italy, Aug. 25, 1969,
7,274/69
Int. Cl. B29c 17/04
U.S. Cl. 425—314                24 Claims

ABSTRACT OF THE DISCLOSURE

A vacuum moulding machine for forming unilaterally directed projecting moulds in continuous webs of thermoplastic synthetic material, comprising a driven rotatable drum, a plurality of suction moulds disposed peripherally around the drum, an automatically controlled vacuum distributor device connecting the suction moulds to a vacuum, and an endless cutting band traversing the web with its cutting portion parallel and adjacent to the web on the side of the projecting mouldings with its cutting edge directed in the opposite direction to the direction of movement of the web, the web passing around and held by suction in contact with the moulds on a portion of the drum periphery while the moulds are formed unilaterally in the web and the cutting device cuts the moulded portions from the web. The cutting band is askew to the direction of web movement and guides are provided for the band cutting portion. A support is provided for the web adjacent to the cutting band and thrust rollers press the web edges against the support. Stacking means are provided for stacking the moulds severed from the web.

FIELD OF THE INVENTION

This invention relates to a rotary vacuum moulding machine for webs of thermoplastic synthetic material or expanded material. Machines of this kind are known comprising a rotatably entrainable drum which carries the suction moulds on its periphery and around which the continuous, hot, plastically deformable web of synthetic or expanded material is guided in contact therewith, and having an automatically controlled vacuum distributor device which connects the suction moulds covered by the softened plastic or expanded material web for a fraction of a drum revolution with a source of vacuum and subsequently to the surrounding atmosphere, as well as having a cutting device for separation of the laterally projecting mouldings produced in the plastic or expanded material web, from the moulded plastic or expanded material web drawn off the suction mould drum.

The main object of the present invention is to provide an improved rotary vacuum moulding machine of this kind to accomplish the separation of the individual mouldings from the plastic or expanded material web, irrespective of the shape, dimensions and arrangement of these mouldings, by means of a cutting device which is reliable in operation and requires as little maintenance as possible, which does not require any protracted or onerous conversion or resetting upon changing moulds, and operates in manner adapted to the high working speed of the rotary vacuum moulding machine.

The main object of the present invention is to provide a vacuum moulding machine in which this problem is resolved by the cutting device being in the form of an endless circulatingly entrained cutting strip or band arranged in a plane extending transversely and approximately at right angles to the plastic or expanded material web, the cutting portion of which is guided parallel and as close as possible to the moulded plastic or expanded material web at the side of the mouldings projecting therefrom, and has its cutting edge pointing against the direction of travel of this web.

SUMMARY

According to the present invention a vacuum moulding machine for forming unilaterally directed projecting moulds in continuous webs of thermoplastic synthetic material, comprising a driven rotatable drum, a plurality of suction moulds disposed peripherally round the drum, an automatically controlled vacuum distributor device connecting the suction moulds to a vacuum, and an endless cutting band traversing the web with its cutting portion parallel and adjacent to the web on the side of the projecting mouldings with its cutting edge directed in the opposite direction to the direction of movement of the web, the web passing round and held by suction in contact with the moulds on a portion of the drum periphery while the moulds are formed unilaterally in the web and the cutting device cuts the moulded portions from the web.

Preferably the moulded plastic or expanded material web drawn off the suction mould drum runs with its side corresponding to the projecting mouldings closely past the portion of the cutting band which is guided transversely to the web and parallel to its surface and has its cutting edge directed against the direction of travel of the web, which cuts off the individual projecting mouldings by a cut taken parallel to the plastic or expanded material web. This separation of the mouldings is completely unaffected by their shape, size, number and pattern, so that the cutting device need not be repositioned or reset upon changing moulds. At the same time, the cut is made with an endless circulating cutting band which can be replaced with little trouble and expense when worn, and which has a high cutting speed adapted to the working speed of the vacuum moulding machine.

In a preferred form of the invention, the quality of the cut can be improved if the plane in which the cutting band circulates is slightly askew relative to the longitudinal or running direction of the plastic or expanded material web.

A precise cut can be obtained by a support in the area of the cutting band at the other side from the cutting portion of the cutting band, arranged parallel thereto and providing an abutment for the plastic or expanded material web, as well as of contact thrust, retaining and guiding devices for pressing travelling plastic or expanded material web against this support.

An important advantage of the vacuum mouldings machine of the invention is that the cut scrap left behind after the mouldings have been cut off the moulded plastic or expanded material web, represents a continuous unbroken web with perforations, and can be easily removed. The cutting device may be followed by a reeling device or a comminuting device and/or a melting device for the residual scrap web.

BRIEF DESCRIPTION OF THE DRAWINGS

FIGS. 5 and 6 show in longitudinal and cross-section respectively a section of a toothed chain around part of the suction mould drum;

FIG. 11 shows in perspective the cutting band of the cutting device;

DESCRIPTION OF THE PREFERRED EMBODIMENT

Figure 1:
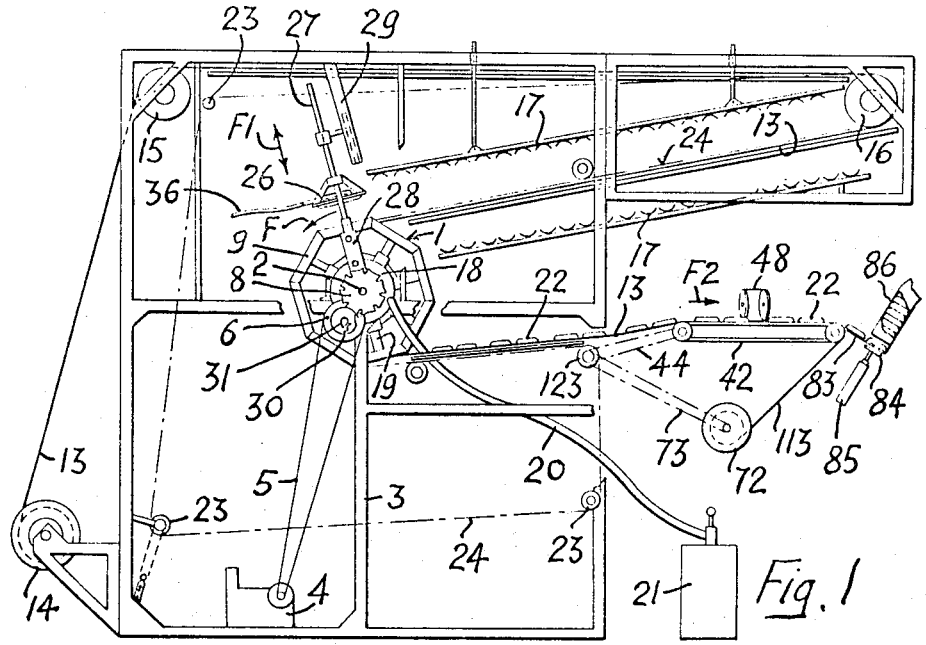
FIG. 1 shows a rotary vacuum moulding machine for thermoplastic plastic webs, in side elevation.

Referring to the drawings, these show a rotary vacuum moulding machine for thermoplastic webs, having a drum 1 rotatable around a horizontal spindle 2 in the machine frame 3. The drum 1 is rotated intermittently in the direction of the arrow F by a geared motor 4, through a belt drive 5, and a Maltese cross transmission 6, 8.

On its periphery, the drum 1 has box-like suction mould receivers 9 giving the drum a polygonal outline. In each mould receiver 9 a suction mould 10 is secured (see FIG. 2). At least in the area of its deepest points, each suction mould 10 has suction holes 11 in communication with a suction chamber 12 formed between the suction mould 10 and the base of the suction mould receiver 9.

The continuous web of thermoplastic material 13 is unreeled from a roll 14 and, after deflection over deflecting rollers 15, 16, traverses a heating device 17 in the form of an electric heat radiation device which softens the plastic web 13 by heating until it acquires plasticity. The heated and plastically deformable plastic web 13 is then passed around the suction mould drum 1, and is stretched around a part of the periphery of the drum and placed on the suction moulds 10.

The plastic web 13 may be a thermoplastic synthetic material or expanded material sheet or foil. A plastic sheet or foil which contains known foaming agents and becomes expanded upon being heated, i.e. shortly after traversing the heating device 17, may however be employed as a plastic web 13. In the latter case, the radiating elements of the heating device 17 are preferably disposed above and below the traversing plastic web 13 to effect as uniform a heating action as possible on the web. On the other hand, the plastic web 13 fed to the suction mould drum 1 may also be supplied direct by a foil extruder preceding the rotary vacuum moulding machine. In this case, the heating device 17 may be omitted, or dimensioned with considerably smaller length or rating.

Figure 3:
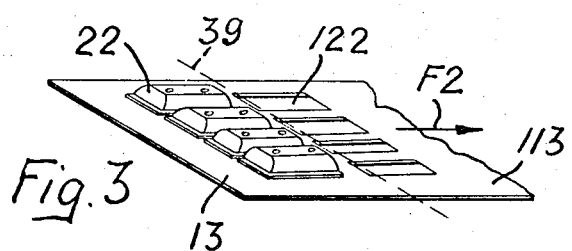
FIGS. 3 and 4 show in perspective and in a side view the mode of operation of the cutting device for separation of the mouldings produced projecting unilaterally from the moulded plastic web.
Figure 4:
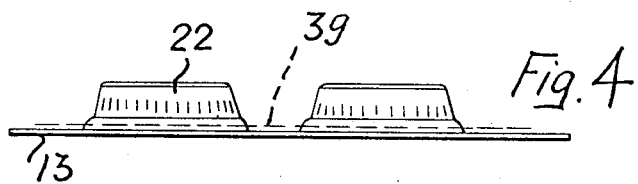

The machine is provided with an automatic vacuum distributor device 18 which connects the suction chambers 12 of the individual box-like suction mould receivers 9 in the peripheral portion of the suction mould drum 1 covered by the plastic web 13 to the suction pipe 20 of a vacuum pump 21 through suction pipes or hoses 19 for a brief period, i.e. for a fraction of a drum revolution. The softened plastic web 13 is thereby drawn into the suction moulds 10 and deformed accordingly. In the terminal portion of the peripheral portion of the suction mould drum 1 covered by the plastic web 13, the suction moulds 10 are connected to the surrounding atmosphere by the vacuum distributor device 18. This cancels the vacuum effect and the plastic web 13 which has been moulded i.e. provided with upwardly projecting mouldings 22, is lifted and drawn off the drum 1. A part of this moulded plastic web 13 is seen in FIGS. 3 and 4.

The seal required for drawing the plastic web 13 into the suction moulds 10 by suction, and the correct position of the plastic web 13 on the suction mould drum 1, are obtained by two endless chains 24 running on deflecting rollers 23, 123, 223 and shown dash-dotted in FIG. 1, which are passed round the drum 1 at either side of the receivers 9 and engage in peripheral grooves 25 of the drum 1 (FIGS. 5 and 6). These chains 24 press the marginal parts of the plastic web still to be moulded or already moulded in sealing manner against the drum 1 or into its peripheral grooves 25, the marginal parts of the plastic web 13 being deformed accordingly. The chains 24 preferably have teeth 124 which engage in the plastic web 13. The circulatory displacement of the chains 24 is engendered by the suction mould drum 1 or by a drive of at least one deflecting roller 23, 123, 223 synchronised with the movement of the drum.

In the case of deeper suction moulds 10, of plastic webs 13 more difficult to deform, especially in the case of expanded material webs or of webs expanded subsequently by heating, the rotary vacuum moulding machine has a mating plunger 26 in the initial part of the peripheral portion of the suction mould drum 1 covered by the plastic web 13 and can be moved towards and away from the drum 1 in a radial direction. The mating plunger 9 is preferably fastened on the piston rod 27 of at least one double-acting hydraulic or pneumatic actuating cylinder 28 laterally arranged beside the suction mould drum 1 on the machine frame 3, and is reciprocatingly displaced thereby in the direction of the double-headed arrow F1 in FIGS. 1 and 2. The piston rod 27 is additionally guided radially of the suction mould drum 1 by a guide 29 on the machine frame 3. The mating plunger 26 has a shape corresponding to the suction moulds 10 and during the stationary interval between two consecutive partial rotary displacements of the intermittently driven suction mould drum 1 is briefly inserted into the suction moulds 10 which are in each case positioned in precise alignment with the mating plunger 26. The softened plastic web 13 running in contact around the drum 1 is pressed into the suction mould 10 by the mating plunger 26 and is premoulded accordingly. The final moulding action is performed by the suction effect of the suction mould 10. The reciprocating motion of the mating plunger 26 is synchronised with the intermittent rotary motion of the suction mould drum 1. To this end, the actuating cylinder 28 of the mating plunger 26 may be controlled by an electric contactor 30, actuated by curve or cam plate 31 or the like together with the suction mould drum 1 or together with a transmission component 6 of this drum 1.

Figure 2:
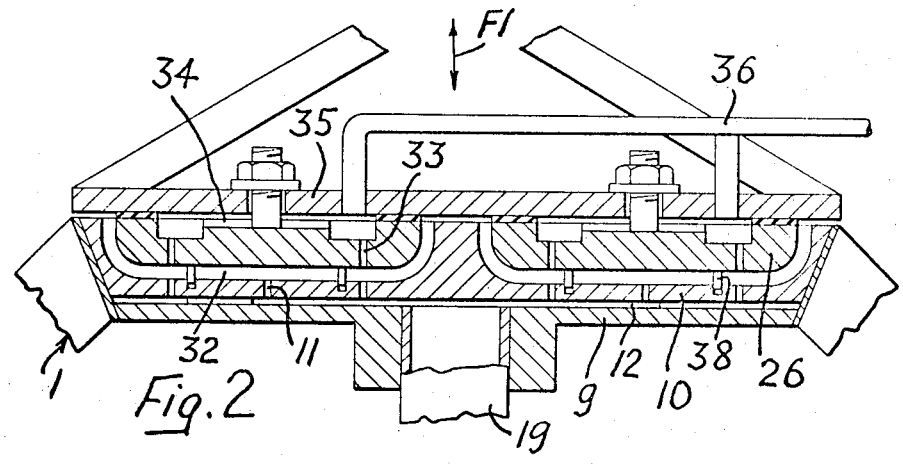
FIG. 2 shows in section a suction mould of the machine of FIG. 1 with a co-ordinated mating plunger engaging in the suction mould.

In the case of plastic webs 13 which are expanded subsequently in the suction mould 10 after being heated by the heating device 17, the inward movement of the mating plunger 26 directed against the suction mould drum 1 is limited in such manner that a gap 32 corresponding to the scheduled wall thickness of the expanded plastic web 13 is left between the inner side of the suction mould 10 and the outer side of the mating plunger 26 inserted into the suction mould, as seen in FIG. 2. The mating plunger 26 also preferably has suction holes 33 in communication with a suction chamber 34 between the mating plunger 26 and its bearer plate 35 and connected to the vacuum distributor device 18 through a hose 36. After the insertion of the mating plunger 26 into the suction mould 10, the suction chamber 12 of the suction mould 10, as well as the suction chamber 34 of the mating plunger 26, are connected at approximately the same time to the suction pipe 20 of the vacuum pump 21 through the vacuum distributor device 18. As a result, a suction effect is exerted on both sides of the portion of the plastic web 13 enclosed between the suction mould 10 and the mating plunger 26. Consequently, the plastic web 13 can expand uniformly and fill the space left free 32 between the suction mould 10 and the mating plunger 26 completely.

The mating plunger 26 may also comprise short projecting piercing or punching plungers 38 which engage in co-ordinated internal bores of the suction mould 10 and cut corresponding holes in the plastic web 13 or in the base of the mouldings 22.

Figure 15:
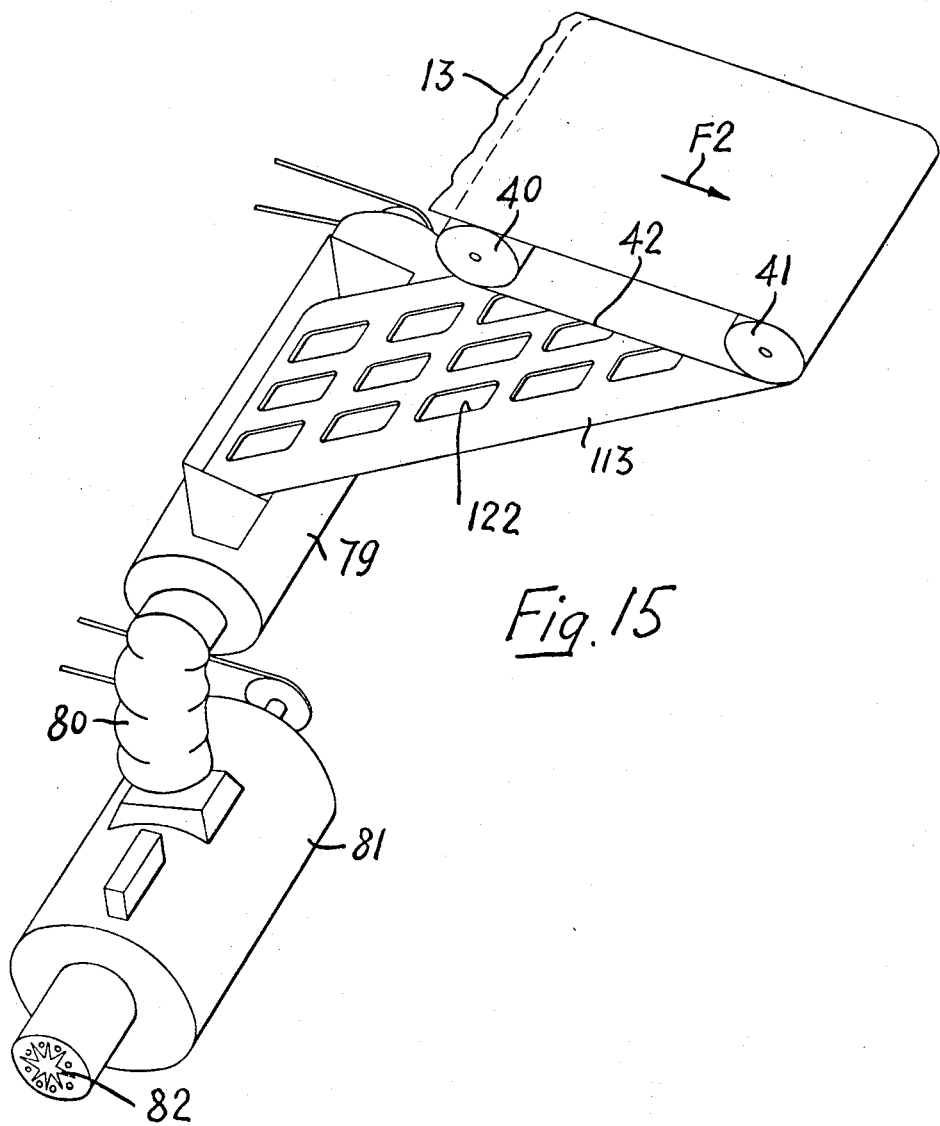
FIG. 15 shows in perspective a comminuting and melting device arranged after the cutting device for the residual scrap web.

79 in which it is ground or torn into small pieces, as seen in FIG. 15. The comminuted plastic or expanded material is conveyed through the discharge duct 80 of the comminuting device 79 to a subsequent melting device 81.

The plastic melt obtained in this device 81 is forced out of the extrusion nozzle 82. In the case of expanded material webs 13, the pieces of the cutting scrap web 113 issuing from the comminuting device 79 may be carried by a conveyor belt or the like through a heating device, e.g. a heating tunnel or the like, to reduce the volume of these pieces of scrap by shrinkage caused by heating.

Figure 12:
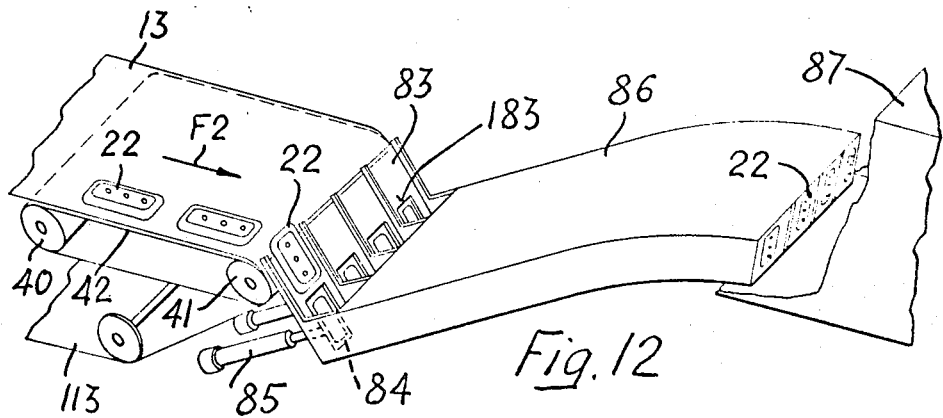
FIG. 12 shows in perspective a stacking device arranged after the cutting device for the cut off mouldings.

A stacking device for the mouldings 22 cut off may moreover be disposed at the egress extremity of the conveyor belt 42. This stacking device consists of a chute 83 which is positioned following the deflecting roller 41 of the conveyor belt 42 and is subdivided into channels co-ordinated with the individual longitudinal rows of the mouldings 22 (see FIG. 12). The mouldings 22 of each longitudinal row dropping off downwards from the cutting scrap web deflected around the deflecting roller 41 of the conveyor belt 42 slide down on the chute 83 and are consecutively positioned before a sliding element 84 situated in the lower area of the chute and insertible through an opening 183 of the chute 83. This sliding element 84 is displaced reciprocatingly in synchronism with the displacement of the plastic or expanded material web 13 e.g. by a hydraulic or pneumatic actuating cylinder 85, in such manner as to effect consecutive insertion of the individual mouldings 22 consecutively sliding down the chute 83 into a stacking and guiding duct 86 situated in front of the sliding element 84. The stacking and guiding duct 86 may open direct into a packaging container 87 or the like, into which the stacks of mouldings formed in the duct 86 are ejected periodically by a longer stroke of the sliding element 84. To this end, the actuating cylinders 85 of the sliding elements 84 may be formed as double-acting telescopic multipiston cylinders.

The invention is not limited to the embodiments described and illustrated, several solutions differing in the structural sense in particular, being possible on the contrary within the scope of the general principle of the invention. On the other hand, all the features apparent from the description and drawings inclusive of the structural details, may be essential to the invention in optional combination.

What we claim is:

1. A vacuum moulding machine for forming unilaterally directed projecting moulds in continuous webs of thermoplastic synthetic material, comprising a driven rotatable drum, a plurality of suction moulds disposed peripherally around the drum, an automatically controlled vacuum distributor device connecting the suction moulds to a vacuum, an endless cutting band traversing the web with its cutting portion parallel and adjacent to the web on the side of the projecting mouldings with its cutting edge directed in the opposite direction to the direction of movement of the web and a guide means provided for the cutting portion of the cutting band, said means at least partially adjustable away from and towards the web and at least partially in the form of guiding elements including guiding slots close to the surface of the web and opening against the direction of travel of the web, the web further being arranged to pass around and be held by suction in contact with the moulds on a portion of the drum periphery while the moulds are formed unilaterally in the web and the cutting device cuts the moulded portion from the web.

2. A vacuum moulding machine according to claim 1, wherein the cutting band moves in a plane extending slightly askew to the direction of movement of the web.

3. A vacuum moulding machine according to claim 1, wherein a web support is provided in the area of the cutting band at the other side from and parallel to the cutting portion thereof and contact thrust, retaining and guiding means are provided for pressing the moving web against this support.

4. A vacuum moulding machine according to claim 3, wherein lateral contact thrust rollers are mounted and displaceable towards and away from the support and are biassed to press the edges of the web against the support.

5. A vacuum moulding machine according to claim 3, wherein retaining elements are mounted and displaceable towards and away from the support and biassed to press the web against the support and are disposed between the longitudinal rows of the projecting mouldings.

6. A vacuum moulding machine according to claim 3, wherein retaining rollers are mounted and displaceable towards and away from the support and biassed to press apertured moulding rims against the support and act on the outer surface of the projecting mouldings.

7. A vacuum moulding machine according to claim 3, wherein lateral guiding ledges are provided and longitudinally directed and overlap the web.

8. A vacuum moulding machine according to claim 3, wherein the support is a rigid stationary plate-like element.

9. A vacuum moulding machine according to claim 3, wherein the support is an endless conveyor belt driven at the speed of travel of the web at least, having a conveying portion preferably supported by a rigid plate-like element.

10. A vacuum moulding machine according to claim 1, wherein a grinding device co-operating permanently with the idle portion of the cutting band is provided for sharpening the cutting edge of the cutting band.

11. A vacuum moulding machine according to claim 10, wherein the cutting band, together with its drive and the sharpening device, is journalled on a cross-member which overbridges the web and is swivellable around a vertical pivot on the machine frame.

12. A vacuum moulding machine according to claim 1, wherein a reeling device, is arranged following the cutting device, for salvage of scrap web remaining after separation of the mouldings.

13. A vacuum moulding machine according to claim 1, wherein a stacking device is arranged following the cutting device, for the severed mouldings.

14. A vacuum moulding machine according to claim 13, wherein following deflection of the scrap web at the extremity of the support in the area of the cutting band, a chute is incorporated for the severed mouldings and at least one sliding element is disposed at the lower extremity of the chute and is reciprocatingly displaced to insert the mouldings consecutively into a stacking and guiding duct.

15. A vacuum moulding machine according to claim 14, wherein the stacking and guiding duct opens into a packaging container and the sliding element periodically performs a longer stroke.

16. A vacuum moulding machine according to claim 1, wherein endless circulating chains are slung at either side of the suction moulds around the suction mold drum for thrusting the marginal parts of the web in sealing manner against the drum in peripheral grooves therein characterised and the chains have teeth like members engaging in the web.

17. A vacuum moulding machine according to claim 16, wherein a part of the idle portion of the teeth-like members engage in the cut scrap web coming from the cutting device and convey the same towards a reeling device.

18. A vacuum moulding machine according to claim 1, wherein the suction mould drum co-operates with a mating plunger displaceable radially away from and towards the drum and briefly insertible into each suction mould, a gap corresponding to the projected wall thickness of the web is disposed between the inner side of the suction mould and the outer side of the mating plunger The moulded plastic or expanded material web 13 drawn off the suction mould drum 1 traverses a cutting device built into the rotary vacuum moulding machine, which separates the individual mouldings projecting at the upper side by a cut 39 taken parallel and as close as possible to the surface of the plastic or expanded material web 13, as shown dash-dotted in FIGS. 3 and 4.

Figure 13:
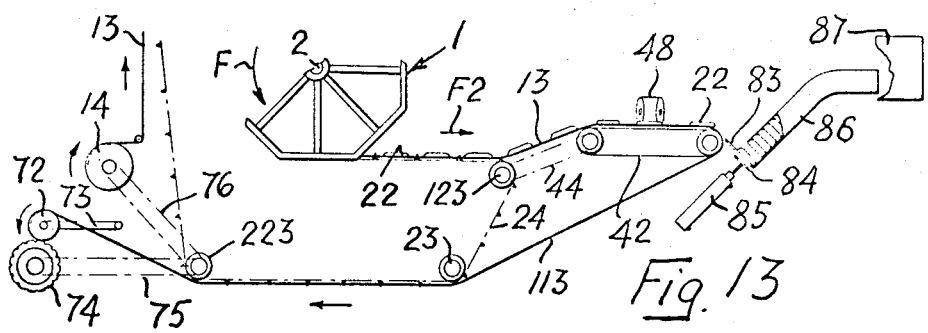
FIGS. 13 and 14 show two different embodiments of the reeling device arranged after the cutting device for the residual scrap web.
Figure 14:
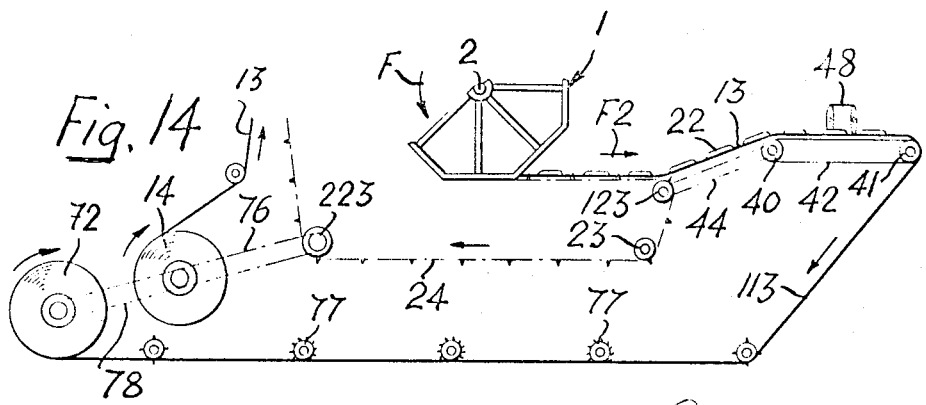
Figure 7:
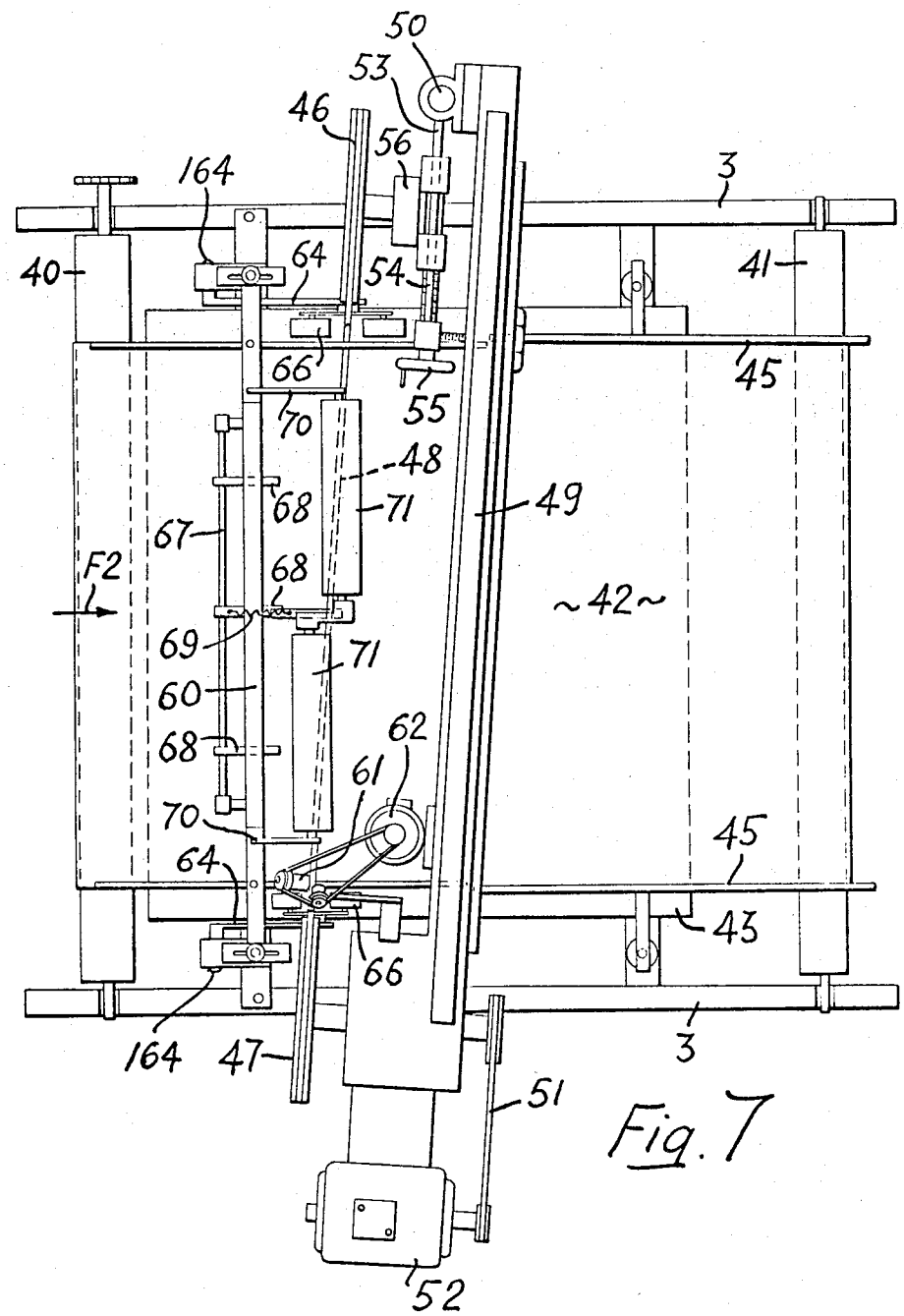
FIG. 7 shows a plan view of the cutting device of the rotary vacuum moulding machine of FIG. 1.
Figure 8:
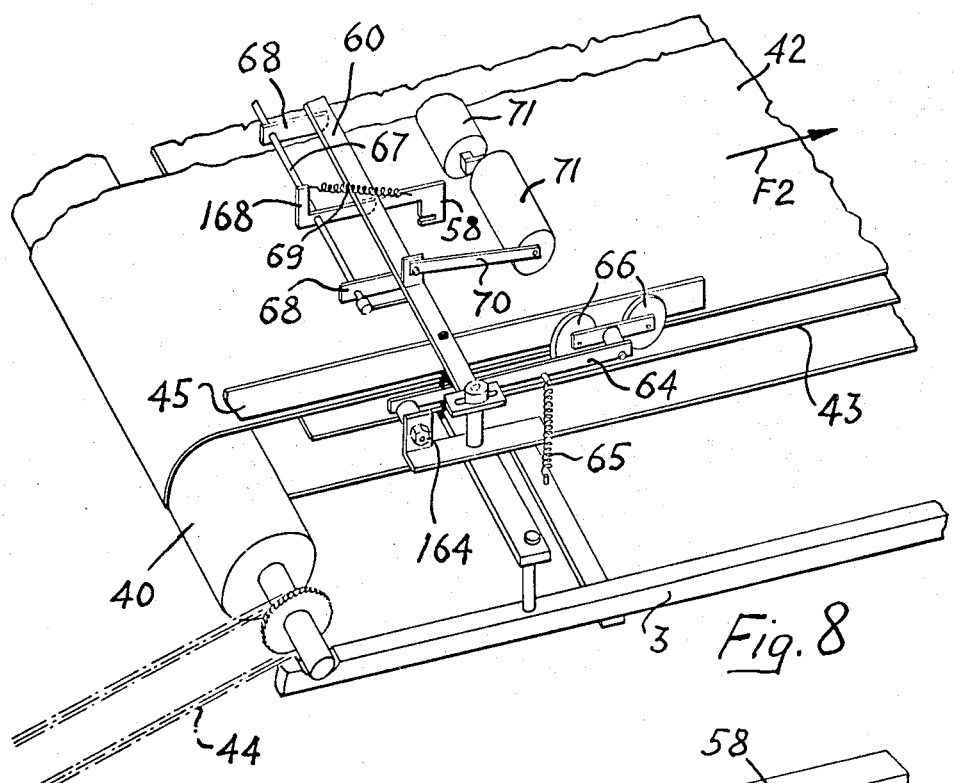
FIG. 8 shows in perspective the contact thrust, retaining and guiding devices for the plastic web in the area of the cutting device.

The cutting device comprises a sufficiently robust support for the moulded plastic or expanded material web 13. In the drawings this support is in the form of an endless horizontal conveyor belt 42 running over the deflecting rollers 40, 41, the upper conveying section of which is supported by a subjacent rigid and stationary plate 43 (FIGS. 7 and 8). The conveyor belt 42 is driven in the direction F2 of the moulded plastic or expanded material web 13 at the same speed as this web. To this end, for example, the deflecting roller 40 of the conveyor belt 42 may be connected by a chain drive 44 to a deflecting roller 123 of the endless chain 24 (FIGS. 1, 13 and 14).

The moulded plastic or expanded material web 13 drawn off the suction mould drum 1 and running onto the conveyor belt 42 is overlapped by two superjacent lateral and longitudinally directed guiding ledges 45 fastened on the machine frame 3 (FIGS. 7 and 8). Above the conveyor belt 42 and the plastic or expanded material web 13 is arranged an endless cutting band 48 passing round two deflecting pulleys 46, 47 (FIGS. 7 and 11). This cutting band 48 is in a vertical plane substantially at right angles to the plastic or expanded material web 13 and obliquely or preferably slightly askew to the longitudinal or running direction F2 of this web. The lower cutting section 148 of the cutting band 48 extends parallel to the subjacently traversing plastic or expanded material web 13 and as close as possible to the surface of this web, i.e. at the level of the required sectioning plane 39 for separation of the projecting mouldings 22. The cutting edge of the cutting band 48 is directed against the direction of travel F2 of the plastic or expanded material web 13, i.e. towards the left in FIGS. 1, 7 and 11.

The deflecting pulleys 46, 47 of the cutting band 48 are journalled on a cross-member 49 carried by the machine frame 3, which overbridges the conveyor belt 42. To this end, the cross-member 49 has one extremity pivotally journalled round a vertical swivel 50 on the machine frame 3, so that the angled position of the cutting band 48 may be varied and adjusted relative to the direction of travel F2 of the plastic or expanded material web. The means of immobilising the pivotable cross-member 49 in the angled position set, are not shown. The deflecting pulley 47 journalled in the free extremity of the cross-member 49 is driven by an electric motor 52 fastened on the cross-member 49 and acting through a chain or belt drive 51. The other deflecting pulley 46 of the cutting band 48 is arranged in the manner of a tensioning pulley and is journalled in a carriage 56 displaceable in the longitudinal direction of the cross-member 49 on slideways 53 by a lead screw 54 and handwheel 55.

Figure 9:
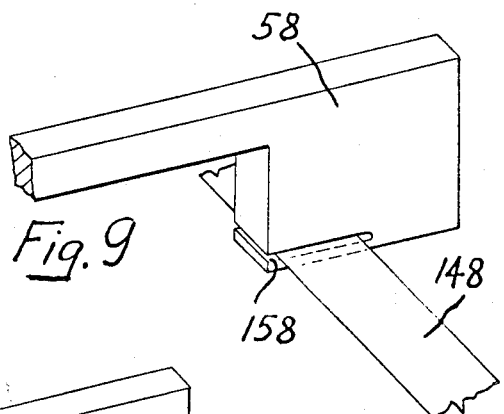
FIGS. 9 and 10 show in perspective parts of the guides for the cutting section of the cutting band of the cutting device.
Figure 10:
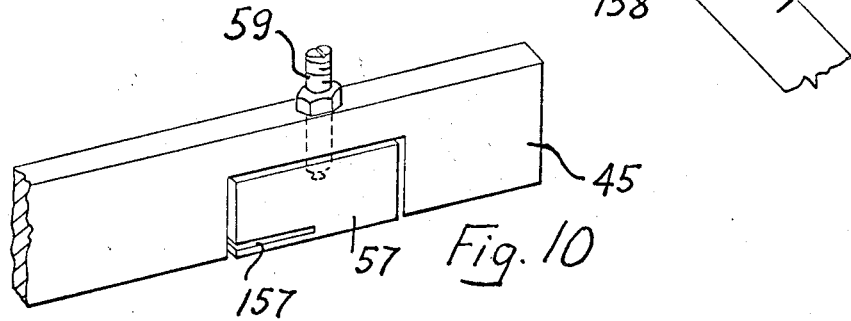

The lower cutting section 148 of the cutting band 48 is guided in guiding elements 57, 58 having guiding slots 157 or 158 disposed as close as possible to the plastic or expanded material web 13 and open against the direction of travel F2 of this web 13 (FIGS. 9, 10 and 11). The two outer guiding elements 57 are arranged in perforations of the lateral guiding ledges 45 and are arranged to be vertically displaceable by actuating screws 59, i.e. adjustable towards or away from the web 13. The middle guiding element 58 is preferably and equally arranged in vertically adjustable manner on a cross-member 60 fastened on the machine frame and over-bridging the conveyor belt 42. The upper idle section 248 of the cutting band 48 is in permanent contact with a grinding device 61 on the cross-member 49, which is driven by an electric motor 62 through a chain or belt drive 63 and sharpens the cutting edge of the cutting band 48 during operation.

Pivot levers 64, which are each drawn downwardly by a spring 65 and on their free extremities have contact thrust rollers 66, are journalled on horizontal swivel pins 164 arranged on the cross-member 60, at either side of the conveyor belt 42, as seen in FIGS. 7 and 8. The thrust contact rollers 66 thrust the corresponding edges of the plastic or expanded material web 13 passing through under the guiding ledges 45 and laterally projecting beyond the longitudinal edges of the conveyor belt 42, against the support plate 43 which equally projects laterally beyond the conveyor belt 42. On the cross-member 60 moreover, a horizontal rod 67 extending at an angle to the direction of travel F2 of the plastic or expanded material web 13, on which are fastened mutually spaced apart retaining fingers 68 sloping downwards in the direction of travel F2 of the web 13, is rotatably journalled. These retaining fingers 68 may have their free extremities equipped with thrust contact rollers (not shown), and just like the middle guide 58 of the cutting band 48, are disposed between the individual longitudinal rows of the moulding 22 projecting from the plastic or expanded material web 13. A spring 69 acting on an upper lever arm 168 of the middle retaining finger 68 exerts a turning moment of such magnitude on the rod 67 that the retaining fingers 68 have their free extremities swivelled downwards against the plastic or expanded material web 13 and press it against the conveyor belt 42. Finally, also incorporated are horizontal retaining rollers 71 directed transversely to the direction of travel F2 of the plastic or expanded material web 13, which are mounted by swivel arms 70 on the cross-member 60 and whose intrinsic weight presses on the projecting mouldings 22 of the plastic or expanded material web 13, i.e. pressing the lower aperture rims of the mouldings 22 against the conveyor belt 42. The contact thrust or retaining means 66, 68 and 71 described, in conjunction with the lateral guiding ledges 45, ensure uninterrupted contact throughout of the plastic or expanded material web 13 on the conveyor belt 42. Consequently, the projecting mouldings 22 are cut off by the circulating cutting band 48 at precisely the same level above the traversing plastic or expanded material web 13, along the cutting plane 39 selected.

The cutting scrap web 113 left after separation of the mouldings 22, containing the corresponding perforations 122 (FIGS. 3 and 15) but intrinsically cohesive and uninterrupted, is downwardly deflected at the egress extremity of the conveyor belt 42 whereas the individual mouldings 22 cut off, drop off the conveyor belt 42 and may be collected or removed in optional manner. The cutting scrap web 113 may be wound into a roll 72, as seen in FIGS. 1, 13 and 14. In FIG. 1 the winding reel 72 of the cutting scrap web 113 is driven through a belt or chain drive 73 by a deflecting pulley 123 of the chains 24. In FIG. 13, the cutting scrap web 113 is grasped by the idle section of the toothed chains 24 and drawn towards the winding reel 72. The winding reel 72 is journalled on a rocking lever 73 and bears freely on a fluted driving roller 74 which, for its part, is driven through a belt or chain drive 75 by a deflecting pulley 223 of the chains 24. The drive of the unwinding reel 14 of the plastic or expanded material web 13 which is to be moulded, is equally derived through a belt or chain drive 76 from the same deflecting pulley 223 of the chains 24. In FIG. 14, the cutting scrap web 113 coming from the cutting device is fed to the corresponding winding reel 72 by driven toothed or barbed rollers 77. The unwinding reel 14 of the plastic or exapnded material web 13 which is to be moulded is driven through a belt or chain drive 76 by a deflecting pulley 223 of the chains 24. The drive of the winding reel 72 of the cutting scrap web 113 is derived through a belt or chain drive 78 from the unwinding reel 14.

The cutting scrap web 113 coming from the cutting device may also be fed direct into a comminuting device inserted into the suction mould, and the suction mould and the mating plunger are with suction holes, preferably simultaneously, connected through the vacuum distributor device to the source of vacuum or to the surrounding atmosphere.

19. A vacuum moulding machine according to claim 18, wherein the mating plunger has penetrating plungers.

20. A vacuum moulding machine according to claim 1, wherein heating devices are disposed above and below the portion of the web running towards the suction mould drum.

21. A vacuum moulding machine according to claim 1, wherein a comminuting device is provided following the cutting device for salvage of scrap web remaining after separation of the mouldings.

22. A vacuum moulding machine according to claim 1, wherein a melting device is arranged following the cutting device for salvage of scrap web remaining after separation of the mouldings.

23. A vacuum moulding machine according to claim 16, wherein a part of the idle portion of the teeth-like members engage in the cut scrap web coming from the cutting device and convey the same towards a comminuting device.

24. A vacuum moulding machine according to claim 16, wherein a part of the idle portion of the teeth-like members engage in the cut scrap web coming from the cutting device and convey the same towards a melting device.

References Cited

UNITED STATES PATENTS

| | | | |
|---|---|---|---|
| 3,026,566 | 3/1962 | Mortelli et al. | 18—19 F |
| 1,728,163 | 9/1929 | Maas | 83—614 X |
| 3,282,140 | 11/1966 | Sasabuchi et al. | 83—353 X |
| 3,395,595 | 8/1968 | Braun et al. | 83—174 |
| 3,181,202 | 5/1965 | Mortelli et al. | 18—19 F |
| 3,479,694 | 11/1969 | Winstead | 18—19 F |
| 3,240,851 | 3/1966 | Scalora | 18—19 F UX |
| 3,561,057 | 2/1971 | Butzko | 18—19 F |

ROBERT L. SPICER, JR., Primary Examiner

U.S. Cl. X.R.

264—92; 83—174, 523; 425—388, 405, 817